United States Patent [19]

Levrai et al.

[11] Patent Number: 5,154,492
[45] Date of Patent: Oct. 13, 1992

[54] LOAD SENSING PROPORTIONING VALVE

[75] Inventors: Roland Levrai, Stains; Philippe Castel, Paris; Patrice Moinard, Montreuil, all of France

[73] Assignee: Bendix Europe Services Techniques, Drancy, France

[21] Appl. No.: 669,828

[22] Filed: Mar. 15, 1991

[30] Foreign Application Priority Data

Mar. 29, 1990 [FR] France .................. 90 04004

[51] Int. Cl.$^5$ .................................. B60T 8/22
[52] U.S. Cl. .................. 303/9.69; 303/22.8; 303/22.1; 188/195; 188/67
[58] Field of Search ............ 303/9.69, 22.1, 22.8; 188/67, 195, 349

[56] References Cited

U.S. PATENT DOCUMENTS

| | | | |
|---|---|---|---|
| 2,192,478 | 3/1940 | Meeks | 188/67 |
| 2,486,663 | 11/1949 | Lovejoy | 188/67 |
| 2,700,201 | 1/1955 | Bannister | 188/67 |
| 3,405,978 | 10/1968 | LePelletier | 303/9.69 |
| 3,643,765 | 2/1972 | Hanchen | 188/67 X |
| 3,892,445 | 7/1975 | Oberthur | 303/9.69 |
| 4,078,778 | 3/1978 | Hubweber | 188/67 X |
| 4,185,539 | 1/1980 | Stratienko | 188/67 X |
| 4,358,163 | 11/1982 | Young | 303/9.69 |
| 4,457,741 | 7/1984 | Hoeptner, III | 188/67 X |
| 4,592,591 | 6/1986 | Wiers | 188/67 X |
| 4,601,232 | 7/1986 | Troxell, Jr. | 188/67 X |
| 4,796,746 | 1/1989 | Bergstrom et al. | 188/67 X |

FOREIGN PATENT DOCUMENTS

| | | | |
|---|---|---|---|
| 3329708 | 3/1985 | Fed. Rep. of Germany | 303/9.69 |
| 3332351 | 3/1985 | Fed. Rep. of Germany | 303/9.69 |
| 3343614 | 6/1985 | Fed. Rep. of Germany | 303/22.8 |

Primary Examiner—Robert J. Oberleitner
Assistant Examiner—Peter M. Poon
Attorney, Agent, or Firm—Larry J. Palguta; Ken C. Decker

[57] ABSTRACT

The load sensing brake proportioning valve of a vehicle comprises a first piston (14) sliding in a stepped bore made in a body, and carrying a normally open shutter (18) arranged between a source of fluid under pressure and the associated brake circuit, the first piston (14) being moveable counter to a spring (16) under the effect of the pressure of the fluid which tends to close the shutter (18), a sliding rod (24) normally bearing between a pusher (20), the position of which is a function of the load of the vehicle, and the shutter (18). The proportioning valve comprises a locking mechanism immobilizing the sliding rod (24) as soon as the pressure of the fluid in the associated brake circuit exceeds a specific threshold.

10 Claims, 1 Drawing Sheet

LOAD SENSING PROPORTIONING VALVE

BACKGROUND OF THE INVENTION

The present invention relates to a brake proportioning valve of a vehicle, subject to the load of the vehicle.

Such proportioning valves are well known in the art, and their functioning will not be described in detail here.

The document DE-A-3,343,614 describes, for example, a proportioning valve according to the precharacterizing clause of the main claim. This proportioning valve is of the type comprising a first piston sliding in a stepped bore made in a body, and carrying a normally open shutter arranged between a source of fluid under pressure and the associated brake circuit, the first piston being moveable counter to a spring under the effect of the pressure of the fluid which tends to close the shutter, a sliding rod normally bearing between a pusher, the position of which is a function of the load of the vehicle, and the shutter.

Such a proportioning valve has a considerable defect which can become serious in some circumstances. In fact, it is known that such a proportioning valve serves for modulating the pressure of the brake fluid in the rear wheels as a function of the pressure of the source under the load of the vehicle, in order to prevent a locking of the rear wheels during braking. Now during a braking operation, the rear wheels are, of course, relieved of stress.

This is because a load transfer towards the front of the vehicle takes place. Since the cut-off point of the proportioning valve is determined as a result of the setting of the proportioning valve at the factory, and since this setting depends on a chosen compromise taking a particular load transfer into account or not, the braking of the vehicle is therefore at its most efficient only in some highly specific instances.

In fact, if the setting is provided for a medium load transfer, if there is rapid braking in which the load transfer is greater than the medium load transfer provided, because of the response time inherent in the proportioning valve the latter "sees" a heavier load than that which actually exists. The rear wheels are thus braked excessively in relation to what they can support, and this can result in a locking of the rear wheels. This perverse effect is amplified with the amount of braking required and therefore runs completely counter to safety.

If the setting is provided for a maximum load transfer, the opposite occurs, and the rear wheels are not braked sufficiently in relation to what they can support (except during rapid braking). The front wheels then ensure too high a proportion of the braking of the vehicle, thereby making it necessary to oversize the corresponding brakes and possibly giving rise to a locking of the front wheels in the event of poor adhesion.

SUMMARY OF THE INVENTION

An object of the present invention is to overcome this major disadvantage arising as a result of a setting involving a compromise, by ensuring that the proportioning valve memorizes the load of the vehicle before the load transfer attributable to the braking. The cut-off point of the proportioning valve can then be set at the factory independently of the stress relief and is no longer the result of a compromise which can have a perverse effect.

To achieve this, according to the invention, the proportioning valve comprises a locking means immobilizing the sliding rod during a braking of the vehicle.

Preferably, the immobilization is commanded when the pressure of the fluid in the associated brake circuit exceeds a specific threshold.

Preferably, the locking means is arranged around the rod between the pusher and the shutter. It comprises, furthermore, a second sliding piston arranged in the bore, sensitive to the pressure of the fluid in the associated brake circuit and commanding the activation of the locking means.

BRIEF DESCRIPTION OF THE DRAWINGS

The invention will now be described by way of example with reference to the accompanying drawings in which.

DETAILED DESCRIPTION OF THE INVENTION

Figure 1:
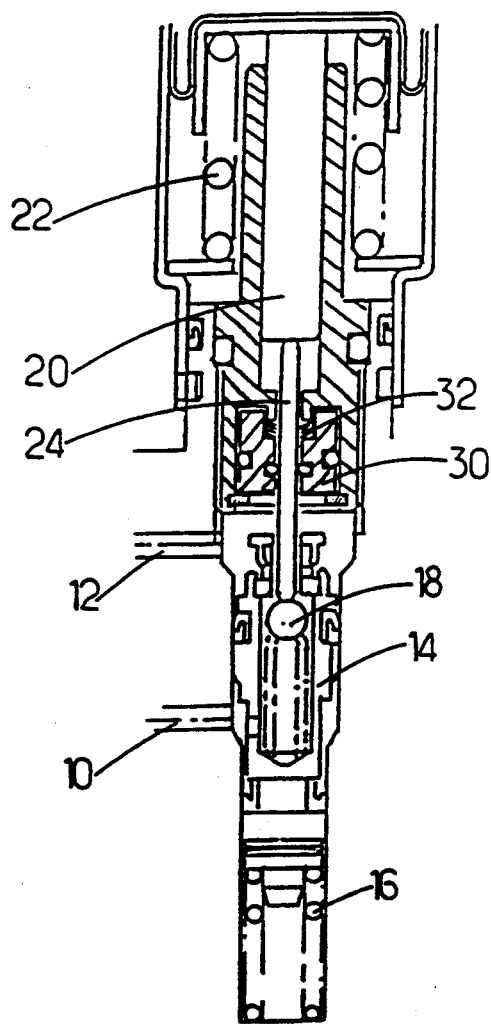
FIG. 1 shows a proportioning valve according to the invention diagrammatically in section.

Referring now to the Figures, a conduit 10 connects the proportioning valve to the source of fluid under pressure, for example a master cylinder, while a conduit 12 connects the proportioning valve to the associated brake circuit.

A piston 14 sliding in the stepped bore is returned to the rest position by means of a spring 16 and forms a seat for a normally open shutter 18, for example a ball, allowing communication between the conduits 10 and 12. The vehicle load information is transmitted in the form of a force exerted on a pusher 20 counter to a spring 22 in the example illustrated. This pusher moves a sliding rod 24, one end of which normally bears on the shutter 18 in the rest position so as to keep the latter open.

During a braking operation, the pressure of the fluid in the conduit 10 tends to push the piston 14 downwards (in the Figure) counter to the spring 16, thereby tending to close the shutter 18. The position of the pusher 20, which is essentially a function of the load of the vehicle, thus determines the closing moment of this shutter.

To overcome the above-mentioned disadvantage, that is to say, according to the invention, to memorize the information on the actual vehicle load and therefore the normal position of the rod 24, the proportioning valve includes a locking means immobilizing the rod 24 as soon as the pressure of the fluid in the associated brake circuit exceeds a specific threshold.

A second piston 30 is arranged in the bore. This piston 30 of the annular type surrounds the rod 24 and moreover forms an additional guide means for the latter. The lower or inner face of piston 30 is subject to braking pressure transmitted from conduit 10 to conduit 12, while the upper or outer face of piston 30 is subject to atmospheric pressure.

According to the embodiment illustrated in FIG. 1, the locking means consists of a stack of flexible washers 32 surrounding the rod 24 and arranged between the body of the proportioning valve and the second piston 30. Upward movement of second piston 30 is resiliently resisted by the washers 32. These washers have an inner orifice, of which the diameter at rest is larger than that of the rod 24, but clamp this rod 24 when they are compressed. These washers can particularly be of the Belleville, serrated or fan type.

It will easily be appreciated that, during a braking operation, the braking pressure exerted on the inner face of second piston 30 tends to move piston 30 upwardly and compress the washers 32. Beyond a specific threshold pressure determined by the resilient reaction force exerted by the washers 32 on the piston 30, the washers 32 compress enough to clamp the rod 24 so as to immobilize it, whatever the actual position of the pusher 20, to which it is not fixed. The proportioning valve therefore keeps the information of the actual load of the vehicle, and the brake pressure in the associated circuit corresponds to the appropriate value.

Figure 2:
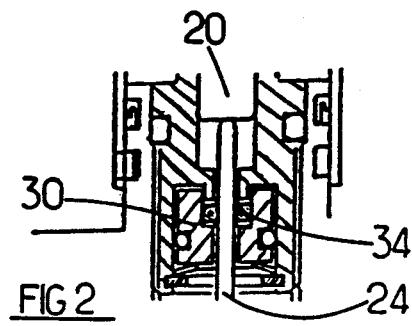

FIG. 2 illustrates another embodiment, in which the washers 32 of the embodiment shown in FIG. 1 are replaced by an elastic ring 34 having, at rest, an inner orifice of a diameter larger than that of the rod 24. Of course, this elastic ring 34 is seated in an annular space formed between the second piston 30 and the body of the proportioning valve, this space being such that, when the second piston 30 receives a pressure, its volume decreases sufficiently to ensure that the elastic ring 34 clamps the rod 24 and immobilizes it.

Figure 3:
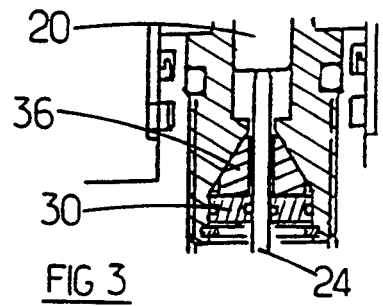
FIGS. 2 to 5 show diagrammatically other embodiments of the invention partially and in section.

In the embodiment illustrated in FIG. 3, the locking means consists of a plurality of jaws 36 which assume an outer shape of substantially frustoconical cross-section and the surface of which comes to bear on a part of complementary shape made in the bore. At rest, these jaws 36 define an orifice of a diameter larger than that of the rod 24. It will be appreciated that, under the effect of the pressure in the associated brake circuit, the second piston 30 pushes the jaws against the part of complementary shape and that this results in a clamping of the jaws 36 against the rod 24 which is thus immobilized.

Figure 4:
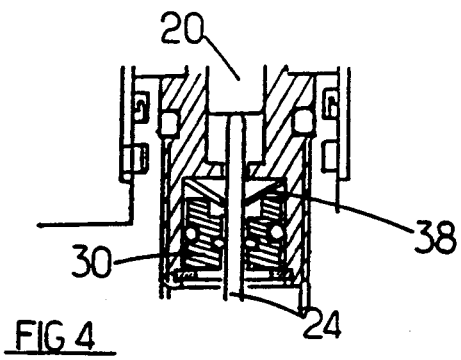

FIG. 4 illustrates a fourth embodiment, in which the locking means consists of jaws in the form of levers 38 bearing on the body of the proportioning valve and receiving a force exerted by the second piston 30 under the effect of the pressure of the fluid in the associated brake circuit.

The mode of operation is identical to the others.

Figure 5:
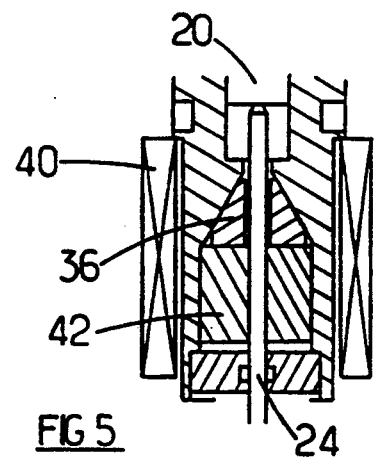

It will be appreciated that many alternative versions can be provided by an average person skilled in the art, without departing from the scope of the invention, as defined by the accompanying claims. In particular, referring to FIG. 5, the second piston 30 can easily be replaced by an electromagnet which comprises a magnetic core 42 and a solenoid 40 and which will be energized during a braking operation, in order to cause the jaws 36 to clamp the rod 24, and the braking operation can advantageously be that ensuring the lighting of the stop lights of the vehicle.

What we claim is:

1. A load sensing brake proportioning valve of a vehicle, comprising a first piston sliding in a stepped bore made in a body and carrying a normally open shutter arranged between a source of fluid under pressure and an associated brake circuit, said first piston being moveable counter to a spring under the effect of the pressure of said fluid and which tends to close said shutter, a sliding rod normally bearing between a pusher, the position of which is a function of the load of the vehicle, and said shutter, and a locking means immobilizing said sliding rod during a braking of the vehicle.

2. The brake proportioning valve according to claim 1, wherein said locking means is arranged around said rod and between said pusher and said shutter.

3. The brake proportioning valve according to claim 1 wherein said sliding rod is immobilized as soon as the pressure of the fluid in the associated brake circuit exceeds a specific threshold.

4. The brake proportioning valve according to claim 3, the locking means comprising a second sliding piston arranged in said bore, sensitive to the pressure of the fluid in said associated brake circuit and controlling the activation of said locking means.

5. The brake proportioning valve according to claim 4, wherein said locking means further comprises a set of flexible washers surrounding said rod and bearing on said body and said second piston, said washers having an inner orifice, of which diameter at rest is larger than that of said rod and which clamps said rod under the effect of a compression force exerted by said second sliding piston.

6. The brake proportioning valve according to claim 4, wherein said locking means further comprises a plurality of jaws surrounding said rod and, at rest, defining an orifice of a diameter larger than that of said rod and clamping said rod under the effect of a force exerted by the second sliding piston.

7. The brake proportioning valve according to claim 6, wherein each jaw assumes an outer shape of substantially frustoconical cross-section, a surface of which comes to bear on a part of complementary shape made in said bore, in order to clamp said rod.

8. The brake proportioning valve according to claim 6, wherein the jaws assume the shape of levers bearing on said body and receiving a force from said second sliding piston in order to clamp said rod.

9. The brake proportioning valve according to claim 4, wherein said locking means further comprises an elastic ring surrounding said rod and seated in an annular space formed between said second piston and said body, said elastic ring having an inner orifice with a diameter, at rest, larger than that of the rod, the volume of said space being such that, under the action of said second sliding piston, said elastic ring compresses said rod and immobilizes the rod.

10. The brake proportioning valve according to claim 1 wherein said locking means is controlled by means of an electromagnet energized during a braking operation.

* * * * *